US007272783B2

(12) United States Patent
Bauchot et al.

(10) Patent No.: US 7,272,783 B2
(45) Date of Patent: Sep. 18, 2007

(54) METHOD AND SYSTEM IN AN ELECTRONIC SPREADSHEET FOR MANAGING AND HANDLING USER-DEFINED OPTIONS

(75) Inventors: Frederic Bauchot, St Jeannet (FR); Daniel Mauduit, Nice (FR); Albert Harari, Nice (FR)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 09/838,420

(22) Filed: Apr. 19, 2001

(65) Prior Publication Data

US 2002/0007372 A1    Jan. 17, 2002

(30) Foreign Application Priority Data

Jul. 13, 2000    (EP)    ................... 00480060

(51) Int. Cl.
*G06F 15/00* (2006.01)
*G06F 17/00* (2006.01)
*G06F 7/00* (2006.01)

(52) U.S. Cl. .................. 715/503; 715/504; 715/538; 707/102

(58) Field of Classification Search ................ 715/503, 715/504, 538; 707/102
See application file for complete search history.

(56) References Cited

U.S. PATENT DOCUMENTS

| 5,231,577 | A | * | 7/1993 | Koss | ........................... 715/504 |
|---|---|---|---|---|---|
| 5,280,575 | A | * | 1/1994 | Young et al. | ................ 715/504 |
| 5,359,729 | A | * | 10/1994 | Yarnell et al. | ................. 707/2 |
| 5,371,675 | A | * | 12/1994 | Greif et al. | ................. 715/503 |
| 5,418,902 | A | * | 5/1995 | West et al. | ................. 715/503 |
| 5,499,180 | A | * | 3/1996 | Ammirato et al. | .......... 715/503 |
| 5,504,848 | A | * | 4/1996 | Yamada et al. | ............. 715/503 |
| 5,598,519 | A | * | 1/1997 | Narayanan | ................... 715/504 |
| 5,603,021 | A | * | 2/1997 | Spencer et al. | ................. 707/4 |
| 5,604,854 | A | * | 2/1997 | Glassey | ....................... 715/503 |
| 5,613,131 | A | * | 3/1997 | Moss et al. | .................. 715/509 |
| 5,701,499 | A | * | 12/1997 | Capson et al. | .............. 715/503 |
| 5,708,827 | A | * | 1/1998 | Kaneko et al. | ............. 715/503 |
| 5,713,020 | A | * | 1/1998 | Reiter et al. | ................. 707/102 |
| 5,806,078 | A |   | 9/1998 | Hug et al. |   |
| 5,819,293 | A | * | 10/1998 | Comer et al. | ................ 707/203 |
| 5,848,393 | A | * | 12/1998 | Goodridge et al. | ............ 705/8 |
| 5,881,381 | A | * | 3/1999 | Yamashita et al. | .......... 715/509 |
| 5,883,623 | A | * | 3/1999 | Cseri | .......................... 715/866 |

(Continued)

OTHER PUBLICATIONS

"Formulas and Logic Downloads", www.xl-logic.com/pages/formulas.html, downloaded by Examiner on Jun. 17, 2003.*

(Continued)

*Primary Examiner*—Shahid Alam
*Assistant Examiner*—Robert Stevens
(74) *Attorney, Agent, or Firm*—Stephen J. Walder, Jr.; David A. Mims, Jr.

(57) ABSTRACT

In an electronic spreadsheet, an example of a solution provided here comprises defining boolean variables in a table, referencing the boolean variables in one or more cells, and determining the content of the cells. Such a solution may involve managing the boolean variables (also referred to as options) by creating a new option, renaming an existing option, or changing the status of an existing option, for example.

20 Claims, 9 Drawing Sheets

U.S. PATENT DOCUMENTS

| | | | |
|---|---|---|---|
| 5,893,087 A | | 4/1999 | Wlaschin et al. |
| 5,983,268 A | * | 11/1999 | Freivald et al. ............. 709/218 |
| 5,987,481 A | * | 11/1999 | Michelman et al. ........ 715/503 |
| 6,055,548 A | * | 4/2000 | Comer et al. ................ 715/503 |
| 6,057,837 A | | 5/2000 | Hatakeda et al. |
| 6,282,551 B1 | * | 8/2001 | Anderson et al. ........... 715/503 |
| 6,292,811 B1 | * | 9/2001 | Clancey et al. ............. 715/503 |
| 6,327,592 B1 | * | 12/2001 | Yoshikawa .................. 707/101 |
| 6,438,565 B1 | * | 8/2002 | Ammirato et al. .......... 715/503 |
| 6,496,832 B2 | * | 12/2002 | Chi et al. .................... 707/102 |
| 6,640,234 B1 | * | 10/2003 | Coffen et al. ............... 715/538 |
| 6,701,485 B1 | * | 3/2004 | Igra et al. ................... 715/503 |
| 6,948,154 B1 | | 9/2005 | Rothermel et al. |
| 2001/0049699 A1 | * | 12/2001 | Pratley et al. .............. 707/503 |
| 2002/0038303 A1 | * | 3/2002 | Gelfand ...................... 707/100 |
| 2002/0091728 A1 | * | 7/2002 | Kjaer et al. ................. 707/503 |

OTHER PUBLICATIONS

Blood, Aaron T., "cond_sum_array SpreadSheet", Jan. 6, 2000 (www.XL-Logic.com).*

Blood, Aaron, T., "equal_val SpreadSheet", Aug. 10, 2000 (www.XL-Logic.com).*

Blood, Aaron T., "option_box SpreadSheet", Jul. 16, 1999 (www.XL-Logic.com).*

Blood, Aaron T., "same_or_diff SpreadSheet", Sep. 1, 1999 (www.XL-Logic.com).*

Blood, Aaron, T., "sum_between_switches SpreadSheet", Sep. 3, 1999 (www.XL-Logic.com).*

Blood, Aaron T., "sum_if SpreadSheet", Aug. 19, 1999 (www.XL-Logic.com).*

Friedman et al., Problem Solving, Abstraction, and Design Using C++, 2nd Edition, Addison-Wesley, Jun. 1997, pp. 165-167, 406-412, and 540-543.*

Gold et al., The Complete Idiot's Guide to Microsoft Excel 97, 2nd Edition, Que Corporation, Que Corporation, pp. 53-62 (© 1998).*

Granel, Vincent, "The Xxl SpreadSheet Project", Linux Journal, vol. 1999, issue 60es (Apr. 1999), ISSN: 1075-3583. (http://delivery.acm.org/10.1145/330000/327756/a27-linux_jounal_staff.html?key1=327756&key2=5612137801&coll=ACM&dl=ACM&CFID=22784040&CFTOK.*

Jamsa et al., Jamsa's C/C++Programmer's Bible : The Ultimate Guide to C/C++Programming, Jamsa Press, Houston, TX, sections 87106, 1161, 1162, 1228 and 1229 (© 1998).*

Shaw, Susan M. (editor), Using 1-2-3 Release 2.4, Special Edition, Que Corporation, (c) 1992, pp. 54-56, 77-79, 141, 142 and 270-274.*

"SpreadSheet Programming: The New Paradigm in Rapid Application Development", Knowledge Dynamics, Inc., © 2002 (www.KnowledgeDynamics.com).*

Microsoft Press Computer Dictionary, 3rd Edition, Microsoft Press, pp. 126 and 299, © 1997.*

Deitel, H. M., et al., C++: How To Program, 2nd Edition, Prentice Hall, Upper Saddle River, NJ, © 1994, pp. 10, 106-110, 147, 243-244, 256-262, 448, 473-479, 483-485, 707-730, 981-987 and 1043-1045.*

Kelly, Julia, Using Microsoft Excel 97, 3rd Edition, Que Corp., Indianapolis, IN, © 1998, pp. 124-131, 138-144, 154-189, 209-210 and 337-343.*

Microsoft Computer Dictionary, 4th Edition, Microsoft Press, Redmond, WA, © 1999, pp. 29, 56-58, 79, 229, 272, 420 and 434.*

Kelly, Julia, Using Microsoft 97, 3rd Edition, Que Corp., Indianapolis, IN, © 1998, pp. 561 and 563.*

Kernighan, Brian W., et al., The C Programming Language, Prentice-Hall, Inc., Englewood Cliffs, NJ © 1978, p. 41.*

Kelly, Julia, Using Microsoft Excel 97, 3rd Edition, Que Corp., Indianapolis, IN, © 1998, pp. 118-122.*

Microsoft Press Computer Dictionary, 3rd Edition, Microsoft Press, Redmond, WA, © 1997, pp. 30, 133 and 399.*

Hergert, Douglas, "Mastering 1-2-3® Edition for Windows® 95", Sybex Inc., San Francisco, CA, © 1997, pp. 123-127, 130-147, 248-267, 277-279, 436-489, 615-621, 664-666, and 672-674.

* cited by examiner

METHOD AND SYSTEM IN AN ELECTRONIC SPREADSHEET FOR MANAGING AND HANDLING USER-DEFINED OPTIONS

TECHNICAL FIELD OF THE INVENTION

The present invention relates to the field of information processing by digital computers, and more particularly to a method and system, in an electronic spreadsheet, for managing and handling user-defined options.

BACKGROUND ART

Before computers, numerical analyses, particularly financial ones, were usually prepared on an accountant's columnar pad or spreadsheet, with pencil and calculator in hand. By organising data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a convex set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., Using Quattro Pro 2,Borland-OsbomeIMcCraw-Mll, 1990; and LeBlond, G. and Cobb, D., Using 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into the worksheet, thanks to imbedded formulas for instance, the information can be recalculated using different sets of assumptions. The results of each recalculation appears almost instantaneously. Performing this operation manually, with paper and pencil, would require the recalculation of every relationship in the model for each change made. Electronic spreadsheet systems have been invented to solve these "what-if" problems: changing an input and seeing what happens to an output.

"What-if" problems can be formally represented by the definition of one or several user-defined options, each of them representing an assumption which can either be set as "True" or "False." The effect of a single given user defined option can take different forms and requires that the spreadsheet user formally represent this effect thanks to different spreadsheet built-in means. With the spreadsheet technologies currently used, such spreadsheet means can be based on the writing of some spreadsheet formulas (requiring thus some in-depth knowledge of the formula language and syntax), or can also be based on the utilization of so-called "versions". In both cases, there are several limitations which can turn these spreadsheet means into inefficient and error-prone solutions.

When relying on spreadsheet formulas, the user needs first to master the spreadsheet formula language, something which is by far not an easy task for somebody not used to programming languages. Then the user must define by himself some formal representation of the user-defined options, with the associated means for managing them: this second task is even more difficult as the user cannot rely on any stringent set of rules (as the ones implemented in a language compiler or interpreter) to determine if his work is error-free. Furthermore an electronic spreadsheet prepared by a given user with his or her own way of representing options will be difficult to be used by another user if the latter has not received precise instructions from the former on the way to handle the options. In short, unless mastering advanced programming skills, it is virtually impossible for a regular spreadsheet user to realise and share error-free "what-if" scenario thanks to user-defined options, by solely relying on the spreadsheet built-in formula language.

Current spreadsheet tools implement today the concept of versions and version groups, which represent some advantages with respect to the previous approach. Nevertheless using versions presents also some limitations, as outlined hereafter. With conventional electronic spreadsheets, versions are associated to ranges of cells. Once a range of cell is "versionned", the user can defined several versions for this range. In the classical case where multiple options must be managed, the number of versions to be defined may become excessive. Indeed if an electronic spreadsheet must address a set of N independent options, any cell whose content depends on these N options should be represented with $2^N$ versions, each of them corresponding to a given combination of these N options. Besides the resulting increase in file and memory storage (leading to degraded performances), this situation may become almost unmanageable for the user, specially in the case where multiple dispersed cells are versionned, even with the concept of version groups allowing to associate versions on different ranges of cells.

SUMMARY OF THE INVENTION

The present invention relates to the field of information processing by digital computers, and more particularly to a method and system of processing user defined boolean variables in a multi dimensional spreadsheet comprising a plurality of cells identified by a cell address along each dimension, said method comprising the steps of:

defining one or a plurality of boolean variables in a table;

referencing the one or plurality of boolean variables in one or a plurality of cells;

activating one or plurality of boolean variables in the table;

determining the content of the cell or plurality of cells depending on whether the one or plurality of boolean variables are activated or not in the table.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENT

System Hardware

Figure 1A:
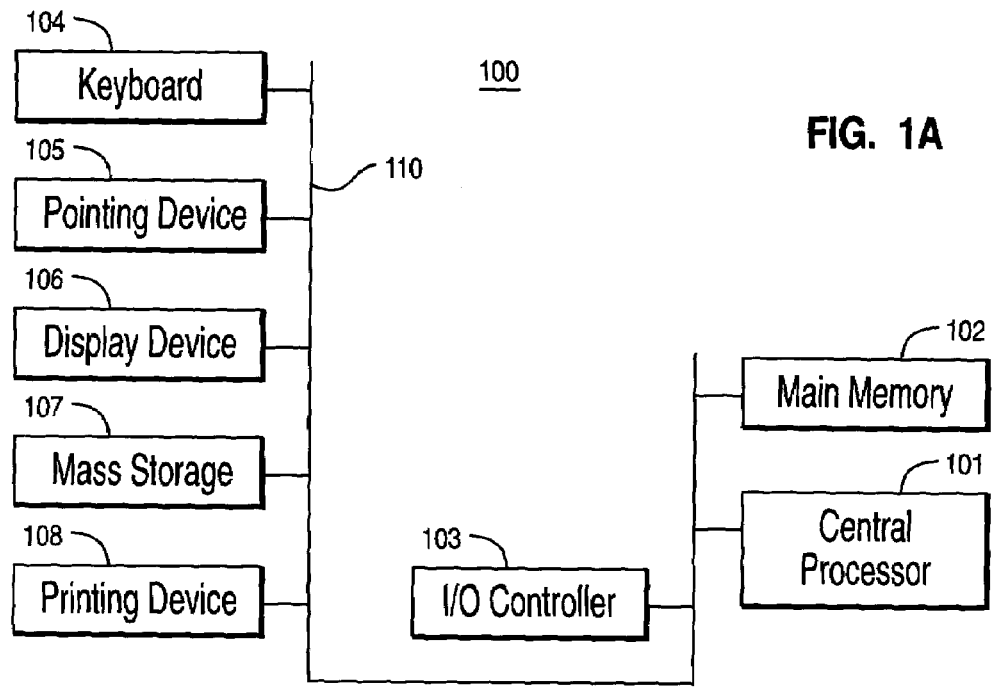
FIG. 1A is a block diagram of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
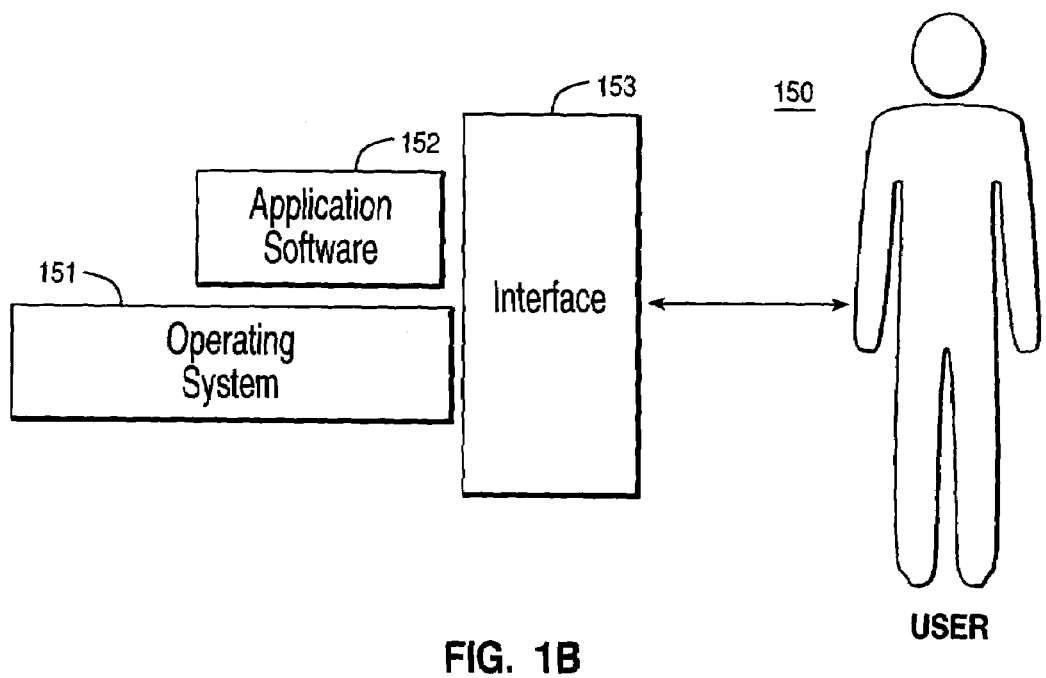
FIG. 1B is a block diagram of a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded' (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figures 1, 1C:
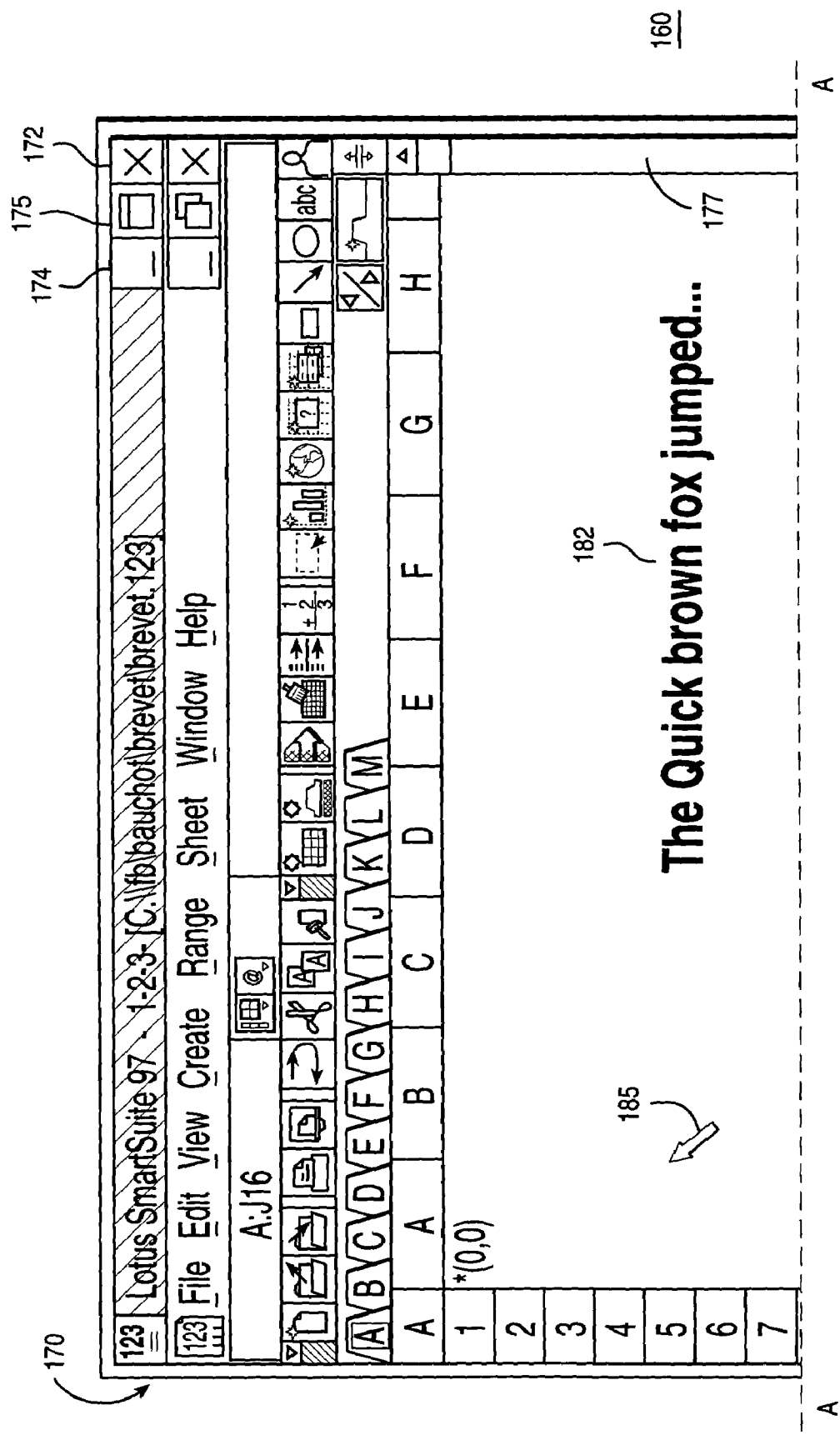
FIG. 1C illustrates the basic architecture and functionality of a graphical user interface in which the present invention may be embodied.
Figures 1, 1C, 2:
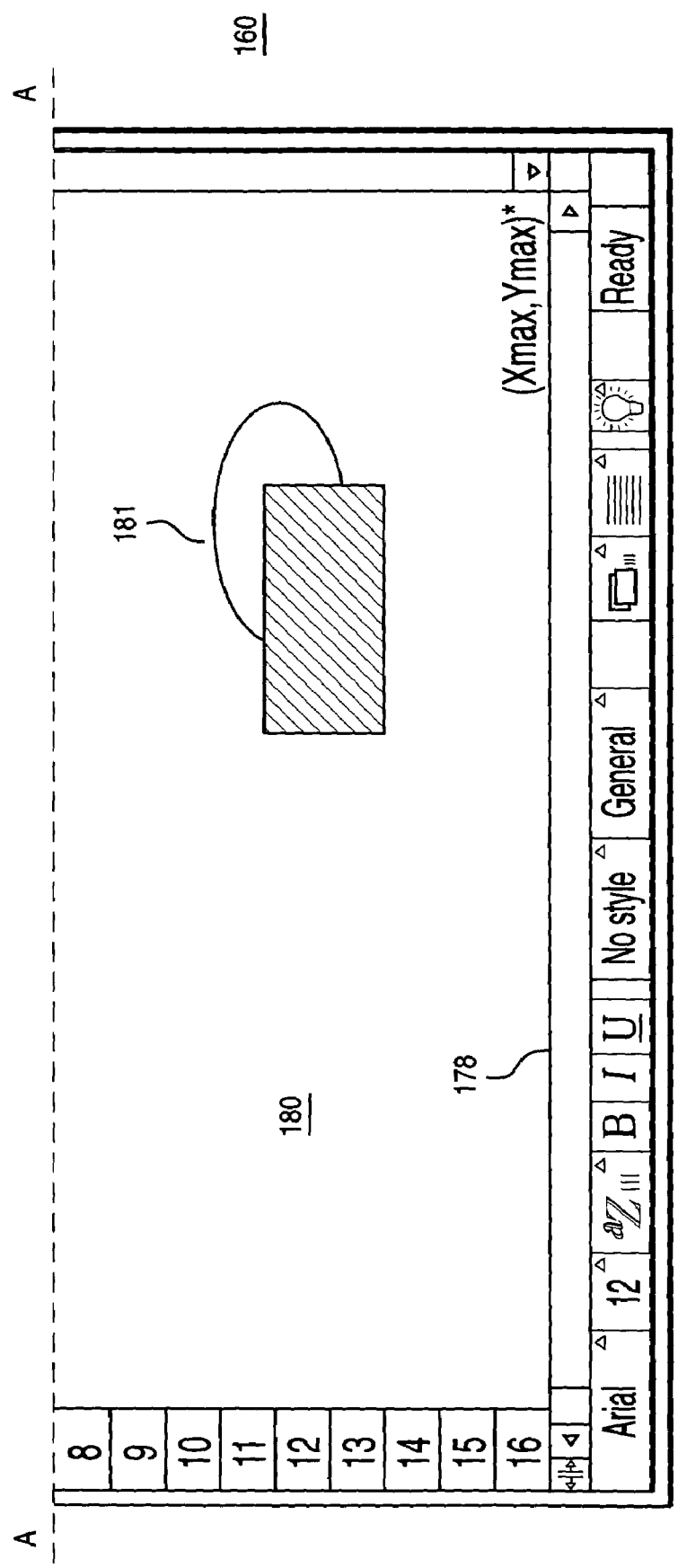

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred interface

Figures 1, 2A:
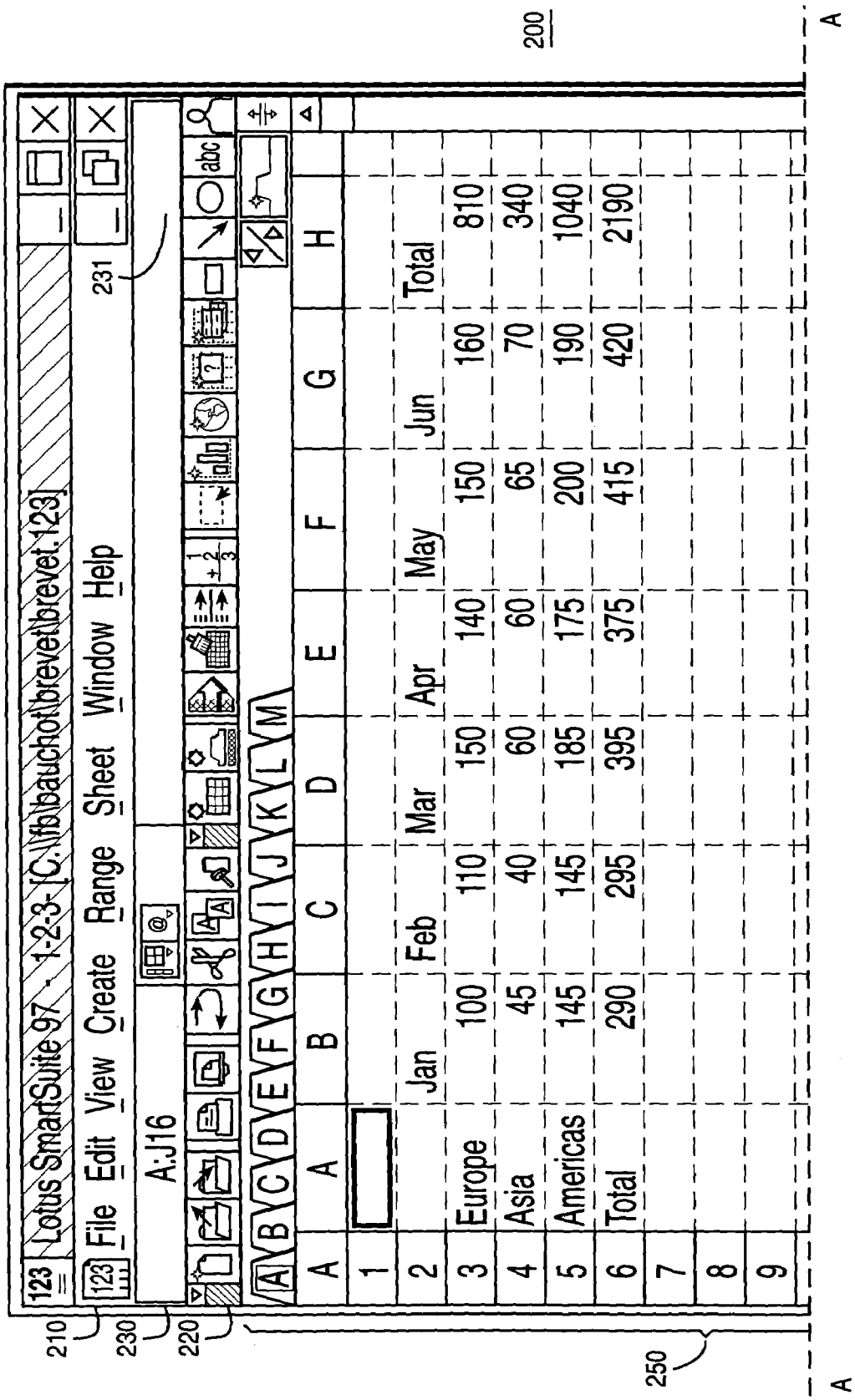
FIG. 2A shows a spreadsheet notebook interface according to the preferred embodiment of the present invention.
Figures 2, 2A:
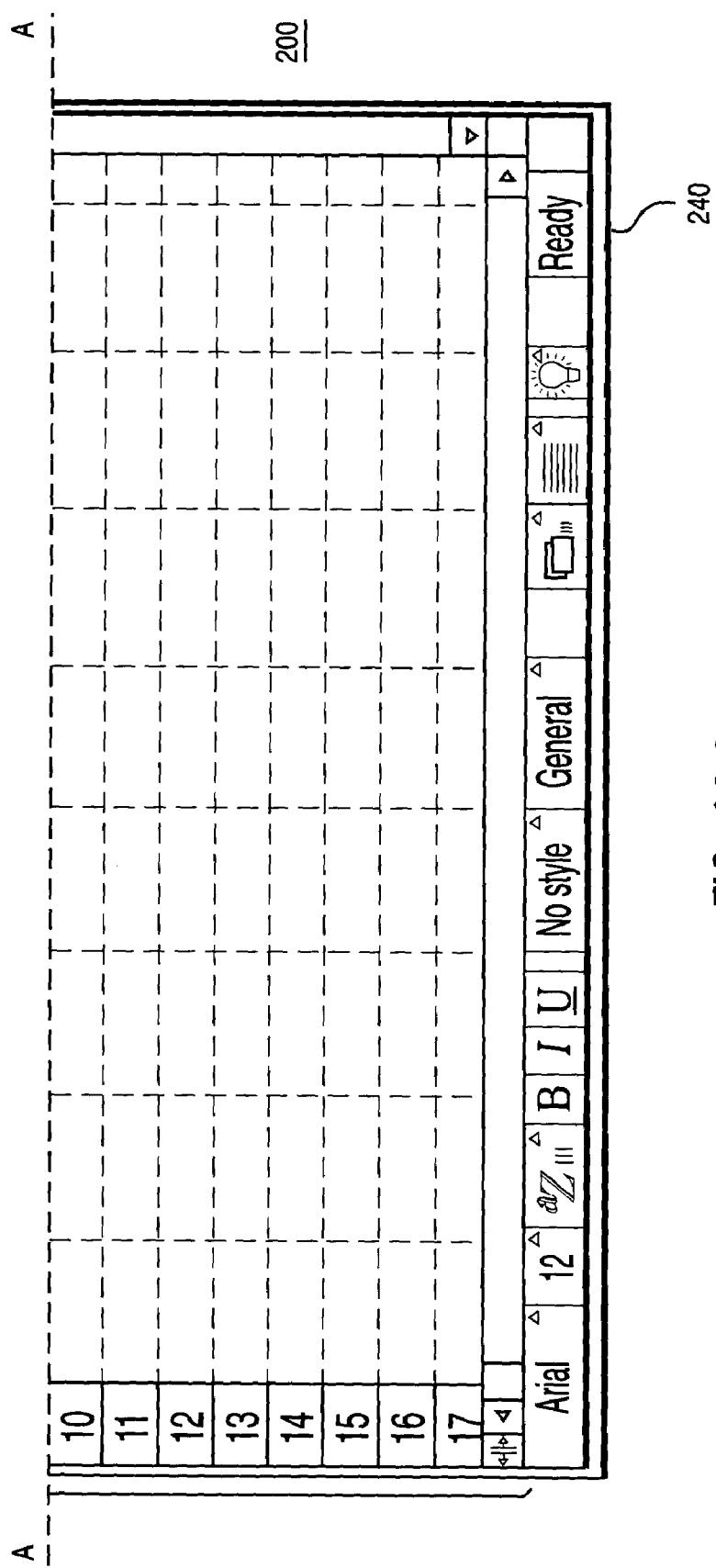

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
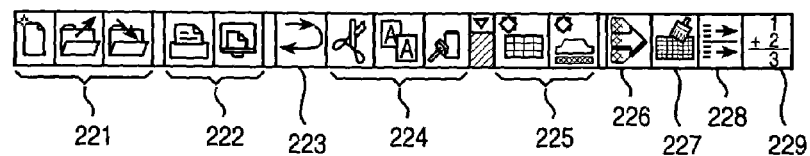
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
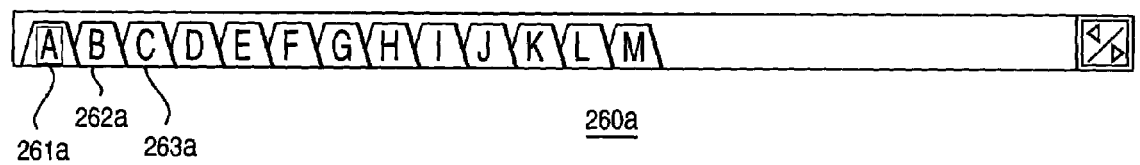
FIGS. 2C and 2D show page identifiers for rapidly accessing and manipulating individual pages of the notebook interface shown in FIG. 2A.
Figure 2D:
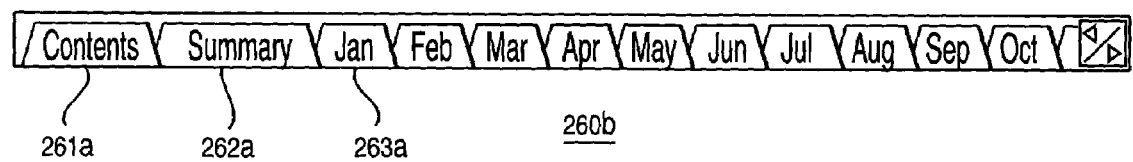

As shown in FIGS. 2C-D, individual notebook pages are identified by page identifiers 260, preferably located along one edge of a DO notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (Getting Started, User's Guide and Building Spreadsheet Applications), available from Borland International.

Management Of User-Defined Options

A. Introduction

As the power of spreadsheet environments has increased since several years, it is today possible to develop complex custom applications solely based on spreadsheets, as opposed to applications developed with general purpose programming languages like C++ or VisualBasic from Microsoft Corporation. This can be achieved thanks to spreadsheet imbedded tools such as macro languages, script languages, formulas and versions. In typical spreadsheet based applications, it is common to find individual cells or ranges of multiple cells whose content depends on one or several conditions. Running "what-if" scenario can therefore be seen as applying different sets of conditions to such condition dependent cells. With conventional electronic spreadsheet tools, this can be achieved thanks to the concept of version. A version is always associated to a range of cells (whether it contains a single cell or multiple cells) and can be seen as a set of mutually exclusive instances of this range of cells. When multiple independent conditions have to be taken into account for running the "what-if" scenario, the resulting number of versions to be defined varies exponentially with the number of conditions. Indeed with N independent assumptions, there are $2^N$ different combinations of these N assumptions. With N only equal to 7, $2^N$ is already equal to 128. Thus even with a small number of conditions, there is a quite large number of condition combinations, which can easily reach the limit of the spreadsheet. Furthermore when different cells dispersed within an electronic spreadsheet, depend on the same set of conditions, conventional electronic spreadsheet tools propose to use the concept of version groups. Version groups require from the spreadsheet user a careful definition of the dependencies between the versions of the different cell ranges.

The present invention offers a user-friendly solution to this problem by defining a method and a system for managing user-defined options.

In the next sections, the above-mentioned conditions will be referred to as options. An option is defined as a boolean variable, which can be set as "True" or "False" and which may impact the content of any given cell within an electronic spreadsheet, by referencing it just as a conventional named range. For instance the formula "$baseprice*(1–10% *$discount)" refers on one hand to a conventional named range "baseprice" and on the other hand to a named range "discount" which is also defined as an option according to the present invention. In this example, when the option "discount" is "false" (with option value "false" conventionally set to 0), the formula takes the same value as the one contained in the named range "baseprice". Alternatively, when the option "discount" is "true" (with option value "true" conventionally set to 1), the formula results in a value equal to the value of the named range "baseprice", decreased by 10%.

B. Option Manager

In contrast to just-described conventional tools, the present invention provides a more powerful, user-friendly and interactive approach for managing user-defined options in the form of an "Option Manager". The Option Manager automatically allows the electronic spreadsheet user
- to define if a given condition deserves to be handled as a so-called Option, and afterwards
- to manage this option.

In a preferred embodiment, the present invention is used in three steps
1. The first step occurs when the spreadsheet user decides, based on some criteria not detailed here, if one or several conditions deserve to take advantage of the present invention, that is to be managed as one or several options by the Option Manager.

Figure 3:
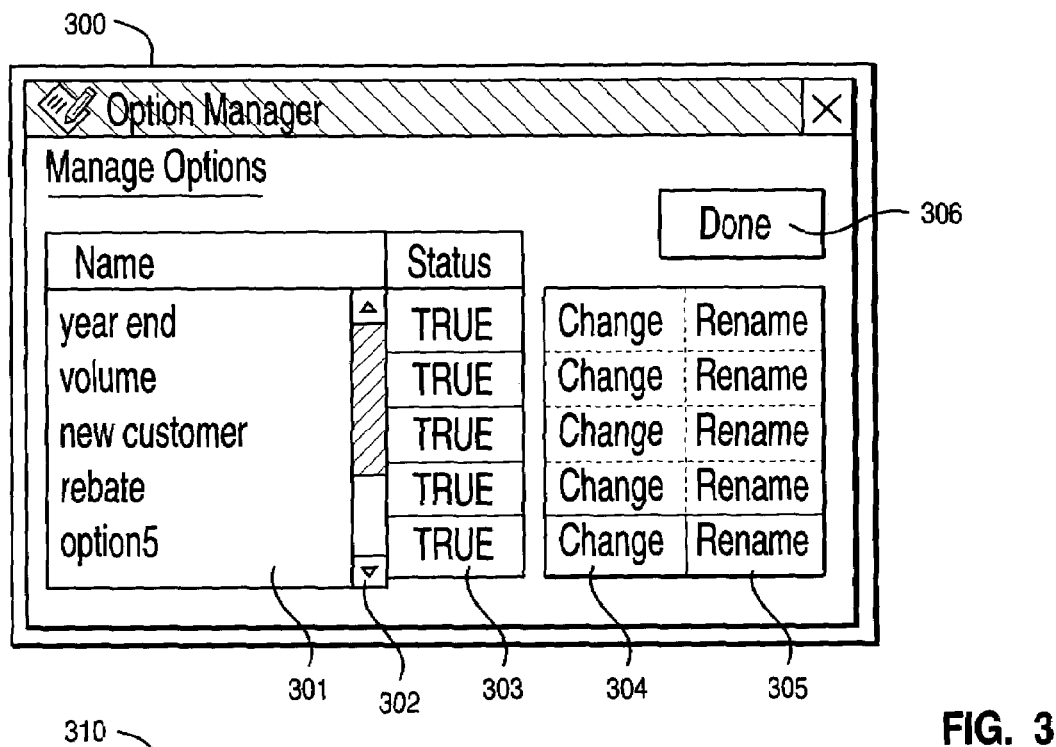
FIG. 3 illustrates a preferred spreadsheet user interface for managing user defined options, according to the present invention.

The user first invokes a specific command called "Option_ Manager" thanks to conventional means available in spreadsheet environment, such as (but not limited to) dedicated push-buttons, keyboard entry short cuts, menu or sub-menu entries. This results in displaying on the Display device 106 an Option Manager Dialog Box 300, as shown by FIG. 3. Within this Option Manager Dialog Box 300, the user can visualise already defined options in the "List Box" 301 (such as the ones named "year end", "volume", "new customer" and "rebate" as shown in FIG. 3), as well as unused options whose names follow some predefined template, such as "option*" where the character "*" is a wild card for representing numbers. In the example shown in FIG. 3, the bottom option within the List Box 301 is named "option5" and therefore corresponds in this preferred embodiment as an unused option. Any other similar or different naming convention may be used without departing from the spirit of this invention. To visualise any other options, whether already defined or spare, not displayed within the list box 301 of the Option Manager Dialog Box 300, the user can for instance use the pointing device 105 to click on the scroll bar 302, so that the list box 301 can move upwards on downwards along the full set of used and spare options. Then the user typically decides to use the first unused option ("option5" as shown in the list box 301 within the Option Manager Dialog Box 300) for becoming the first new used option. For this purpose the user uses the pointing device 105 to click on the push-button "Rename" 305 located on the right of the "option5" element of the list box 301. This result in displaying on the display device 106 a new dialog box 310. Within this dialog box 310, a user entry field 311 allows the user to change with the keyboard 104 the default option name "option5" into a new one. If at that point the user decides, for any reason not detailed here, not to define a new option, it can cancel this operation by clicking on the push-button "Cancel" 313. This will result in closing the dialog box 310 from the display device 106 and then giving back control to the Option Manager dialog box 300. Alternatively, if the user wants to continue with the new option definition, it confirms the operation by clicking on the push-button "OK" 313 within the dialog box 310. This will result in closing the dialog box 310 from the display device 106 and then giving back control to the Option Manager dialog box 300. which now shows in the bottom of the list box 301 the new name of the just specified option. If the user wants to defined other new options, it can follow the same steps as long as spare options are left unused. When done, the user uses the pointing device 105 to click on the push-button "Done" 306. This will result in closing the Option Manager Dialog Box 300 on the display device 106.

2. The second step occurs when the spreadsheet user decides, based on his or her own criteria not detailed here, to take advantage of the present invention by manipulating already defined options thanks to the Option Manager. Such manipulation can either be to rename one or several already defined options, or to read and/or to change the status (between the "True" and "False" status) of one or a plurality of already defined options.

In both cases, the user first invokes a specific command called "Option_Manager" thanks to conventional means available in the spreadsheet environment, such as (but not limited to) dedicated push-buttons, keyboard entry short cuts, menu or sub-menu entries. This result in displaying on the display device 106 an Option Manager Dialog Box 300, as shown by FIG. 3. Within this Option Manager Dialog Box 300, the user can visualise already defined options in the "List Box" 301 (such as the ones named "year end", "volume", "new customer" and "rebate" as shown in FIG. 3). To visualise any other defined options possibly not displayed within the list box 301 of the Option Manager Dialog Box 300, the user can for instance use the pointing device 105 to click on the scroll bar 302, so that the list box 301 can move upwards on downwards along the full set of used and spare options. If the user choice is to rename one or several already defined options, then he/she has to follow, for each relevant options, a sequence of steps similar to the ones used to initially define a new option. In short it consists in first using the scroll bar 302 to display within the list box 301 the option to rename, then to click on the push-button "Rename" standing on the right of the selected option (as the push-button 305 if the selected option appears at the bottom of the list box 301), then to replace by using the keyboard 104 within the displayed dialog box 310 the current option name displayed in the window 311, and then to click on the push-button "OK" 312. If the user choice is to read and/or change the status of one or several defined options, he/she begins as above to display within the list box 301 (possibly by using the scroll bar 302) the first option whose status must be read and/or updated. Once done, the status of this option is shown in the label box sitting immediately on the right of the list box 301. For instance if the currently managed option is the bottom one within the list box 301, then this status information is shown in the label box 303; it can take the values "TRUE" or "FALSE". If the user decides, for any reason not detailed here, to change the current status from "TRUE" to "FALSE" or conversely from "FALSE" to "TRUE", then the user must click with the pointing device 105 on the push-button "Change" 304. The effect of this operation is reflected within the Option Manager Dialog Box 300 by swapping the "TRUE" and "FALSE" values shown in the label box 304. All these steps must be repeated for every option for which the user wishes to read and/or update the status. When done, the user uses the pointing device 105 to click on the push-button "Done" 306. This will result in closing the Option Manager Dialog Box 300 on the display device 106.

3. The third step occurs when the spreadsheet user decides, based on his or her own criteria not detailed here, whether the content of a given cell must depend or not on a given specified option. If it is the case, then the option can be referenced within the target cell content as a classical named range, as conventionally done within electronic spreadsheets with the classical rule that the "FALSE" value corresponds to the value 0 and that the "TRUE" value corresponds to the value 1. Let illustrate this by one example. It is assumed that the user relies on his/her electronic spreadsheet to compute the price of an item, and that the pricing structure allows both to apply a 10% discount if the item is sold during the year end promotion period, and to apply a 100$ rebate for fidelity club members. Let further assume that the item base price equal to 1500$ is contained within a cell which has received the name "baseprice", that the spreadsheet user has defined an option named "year end" to reflect if the year end promotion can be applied or not, and that the spreadsheet user has defined an option named "rebate" to reflect if the fidelity club rebate can be applied or not. Then the spreadsheet user can get the item customer price by filling the relevant cell of his/her spreadsheet with a formula taking the following form: "$baseprice*(1–10% *$year end)-$rebate*1500". When the electronic spreadsheet user takes advantage of the present invention by invoking the Option_Manager command for changing the status of the two options "year end" and "rebate" as described above in the second step, then the cell containing the above formula with show the values 1500$, 1350$, 1400$ and 1250$ when the option pair ("year end", "rebate") respectively takes the values (FALSE, FALSE), (TRUE, FALSE), (FALSE, TRUE) and (TRUE, TRUE).

C. Option Table

The decision to define a new option, or to rename an existing option, or to change the status of an existing belongs to the user of the spreadsheet application. A single repository, called "Option Table", is used to record this information. This Option Table is preferably saved on a non volatile memory (typically but not necessary as part of the spreadsheet disk file on the mass storage 107).

Figure 4:
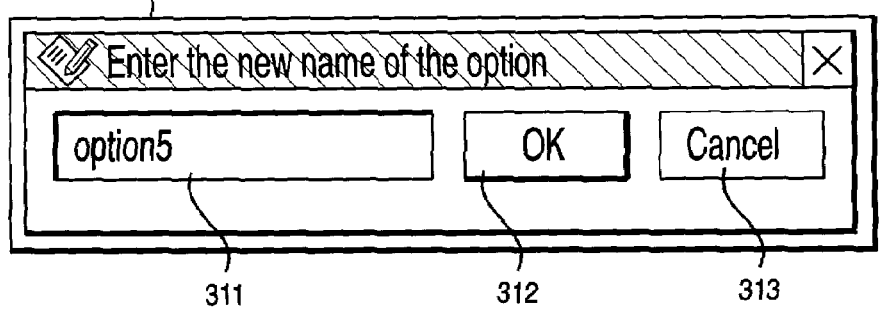
FIG. 4 illustrates the structure of the Option Table in the preferred embodiment of the present invention

Referring now to FIG. 4, the Option Table 400 corresponds to a logical simple structure made of several records 401, each of them associated with an option. Each record includes three fields:

An "Option Index" field 402 is used for sorting the option table. When options are displayed within the list box 301 of the Option Manager Dialog Box 300, they are presented according to the index sequence, starting at the last recorded position.

An "Option Name" field 403 is used to record the name of the option of record 401. As already discussed, the default value of an unused option can follow a template such as "option*". For options defined by the spreadsheet user, the option name field 403 records the user specified name, as it was entered by the spreadsheet user thanks to the window 311 of the dialog box 310.

An "Option Status" field 404 is used to record the current status (either "TRUE" or "FALSE") of the option of record 401. This information is reflected in the label box 303 of the Option Manager Dialog Box 300.

C. Option_Manager method

Figure 6:
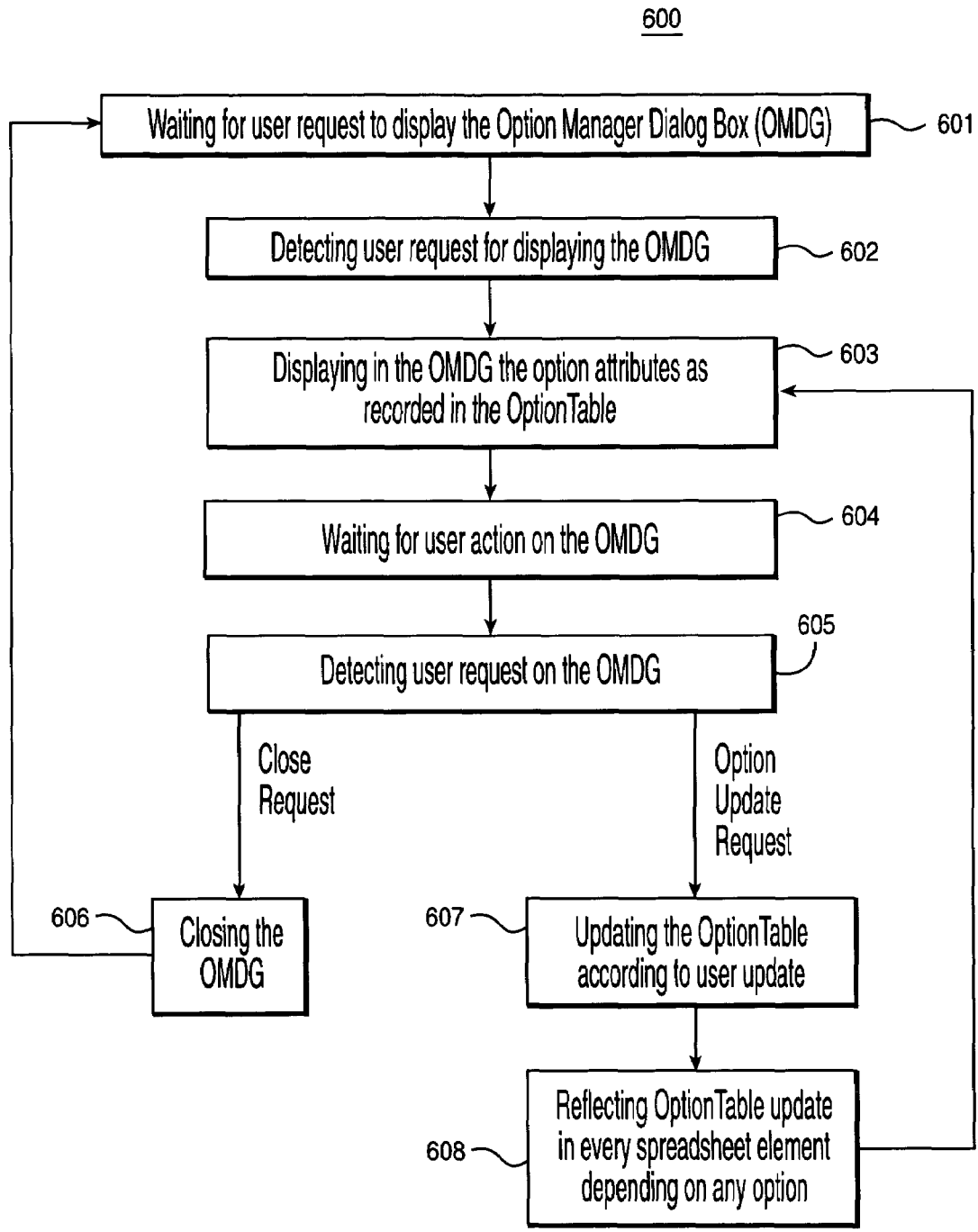
FIG. 6 is a simplified flow chart illustrating the system and method according to the present invention.

The method of managing user-defined options is summarised in FIG. 6:

At step 601, the method is waiting for a user request to display on the display device 106 an Option Manager Dialog Box (OMDG) 300.

At step 602, a user request for displaying the OMDG 300 on the display device 106 is detected.

At step 603, the OMDG 300 is displayed on the display device 106. The option attributes (names and status) are shown in relevant windows as recorded in the option table 400.

At step 604, the method is waiting for a user action on the OMDC 300.

At step 605, a user action on the OMDG 300 for either manipulating the options (creating a new option, renaming an existing option, changing the status of an existing option), or for closing the OMDG 300 is detected. In the former case, control is given to step 606, in the later case control is given to step 607.

At step 606, the OMDG is closed on the display device 106 and control is given back to the initial step 601 for treating any new future request.

At step 607, the option table 400 is updated to reflect the change on the option, as detected during the step 605.

At step 608, every cell of the spreadsheet whose content depends on the user-defined options is updated according to the former option table change. Then control is given back to the step 603 to display in the OMDG the result of the user action which was detecting at step 605.

Figure 5:
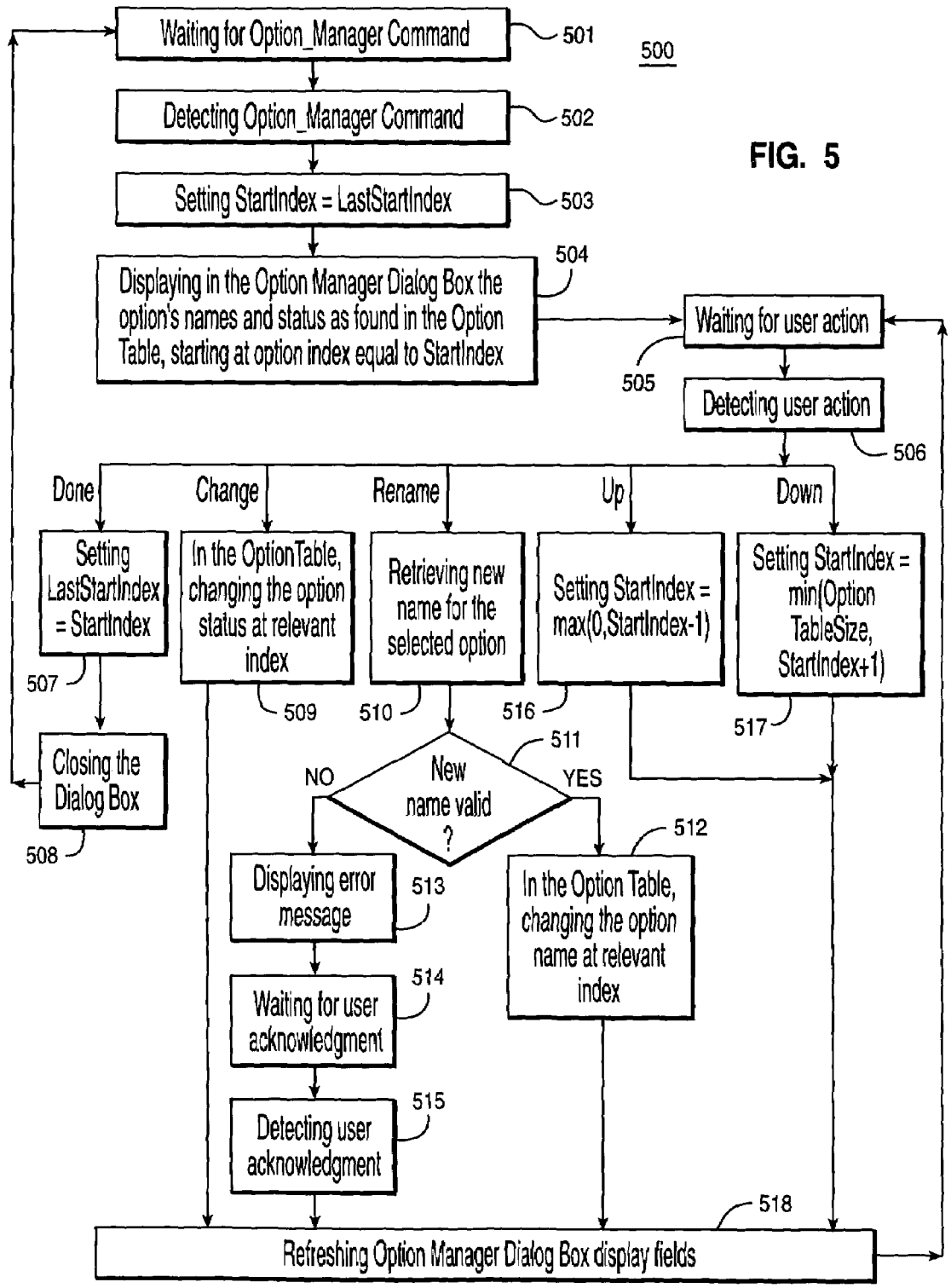
FIG. 5 is a flow chart illustrating a preferred method for managing user-defined options according to the present invention.

The method of handling user-defined options to take advantage of the present invention is detailed in flowchart 500 of FIG. 5. This method can be seen as the processing of the Option_Manager command used for defining a new option, or renaming an existing option, or changing the status of an existing option. The method comprises the following steps:

At step 501, the method is in its default state, waiting for an event to initiate the process.

At step 502, an event is detected, as a result of a user action. This action can be for instance a specific combination of key on the keyboard 104, or the click of the pointing device 105 on a specific button, or any other similar means not further specified here.

At step 503, a local variable named "StartIndex" is initialised with the value of another local variable named "LastStartIndex". This later variable is used to record the option index 402, within the option table 400, of the option which was displayed at the top of the list box 301 within the is Option Manager Dialog Box 300. The two variables StartIndex and LastStartIndex are recorded with classical means, such as but not limited to the spreadsheet disk file on the mass storage 107.

At step 504, the Option Manager Dialog Box 400 is displayed on the display device 106. The option name appearing on the top of the list box 301 corresponds to the option name field 403 of the record 401 in the option table 400 whose option index field 402 is equal to the variable StartIndex. Underneath option names within this list box 301 correspond to the option name fields 403 of the following records 401 of the option table 400. The values "TRUE" or "FALSE" displayed in the label boxes like 303 correspond to the option status fields 404 found in the option table 400 for the same records 401.

At step 505, the method is waiting for any user action on the Option Manager Dialog Box 400. Such user action is typically resulting from a click with the pointing device 105, but take other similar forms such as, but not limited to a specific combination of key on the keyboard 104, or any other similar means not further specified here At step 506, a user action on the Option Manager Dialog Box 400 is detected. If the user action is a click on the push-button "Done" 306, then control is given to step 507; if the user action is a click on a push-button "Change" like 304, then control is given to step 509; if the user action is a click on a push-button "Rename" like 305, then control is given to step 510; if the user action is a click on the up-arrow of the scrolling bar 302, then control is given to step 516; and if the user action is a click on down-arrow of the scrolling bar 302, then control is given to step 517.

At step 507, the value of the variable LastStartIndex is set equal to the current value of the variable StartIndex.

At step 508, the Option Manager Dialog Box 400 is closed, so that it disappears from the display device 106, and control is given back to the initial step 501 for treating any future Option Manager_command.

At step 509, the Option table 400 is updated to modify the option status field 404 for the record 401 whose option name field 403 matches the name found in the list box 301 with the same horizontal relative position as the clicked "Change" push-button of type 304. This option status field 404 modification corresponds to a swap between the values "TRUE" and "FALSE". Then control is given to the step 518.

At step 510, the user is prompted to specify the new name of the selected option. This can be done with conventional means as the Dialog box 310 which is part of the preferred embodiment, but any functionally equivalent means can be used instead, without departing from the spirit of the invention.

At step 511, the new option name specified by the spreadsheet user is checked against a set of rules not detailed here to determine if it is or not a valid option name. Such rules are typically implementation dependent and thus do not belong to the scope of the present invention. If the result of this checking is that the new option name is found as valid, then control is given to step 512, otherwise control is given to step 513.

At step 512, the Option table 400 is updated to modify the option name field 403 for the record 401 whose former option name field 403 matched the previous name which has been updated at step 511. Then control is given to step 518.

At step 513, an error message notification is issued for warning the user that the new name specified at step 510 has not passed the name validity checking of step 511. This can typically be done by displaying on the display device 106 an error message in a pop-up window, but any other similar means could be used instead, without departing from the spirit of the present invention.

At step 514, if the new name specified at step 510 has not passed the name validity checking of step 511, the method is waiting for a user acknowledgement, meaning that the error message notification of step 513 has been received by the spreadsheet user.

At step 515, the user acknowledgement is detected. This can typically correspond to the click, thanks to the pointing device 105, on a "OK" push-button within the pop-up window typically displayed during the step 513, but other similar means can be used instead, without departing from the spirit of the present invention. Then control is given to step 518.

At step 516, the value of the variable StartIndex is decremented as long as the resulting new value remains positive. Then control is given to step 518.

At step 517, the value of the variable StartIndex is incremented as long as the resulting new value remains less or equal than a fixed value OptionTableSize corresponding to the highest option index 402 of a record 401 within the option table 400 that can be displayed within the list box 301 of the Option Manager Dialog Box 300. Then control is given to step 518.

When the step 518 is reached, the fields 301 (list box containing the option names) and 303 (labels reflecting the option status) within the Option Manager Dialog Box 300 are refreshed on the display device 106 to reflect the user actions taken at step 506. Then control is given to step 505.

Alternate Embodiments

While the invention has been particularly shown and described with reference to a preferred embodiment, it will be understood that various changes in form and detail may be made therein without departing from the spirit, and scope of the invention.

The Option_Manager method and system according to the present invention may be used advantageously in environments where elements of information are organised as multidimensional tables having more than three dimensions.

What is claimed is:

1. A method, in a computer system, for processing user defined Boolean variables in a multi-dimensional electronic spreadsheet comprising a plurality of cells identified by a cell address along each dimension, said method comprising the steps of:
    providing a model by configuring a memory of the computer system to represent a multi-dimensional electronic spreadsheet model;
    providing, in the computer system, a user options table data structure identifying one or more user options that are defined as Boolean variables, wherein the user options table data structure comprises a record for each user option of the one or more user options, and wherein each record stores an identifier associated with a corresponding user option for the record;
    providing a user interface, in the computer system, through which the one or more user options are defined, wherein a status of the one or more user options is set via the user interface to either a first Boolean variable state corresponding to a "True" state or a second Boolean variable state corresponding to a "False" state;
    referencing a selected user option of the one or more user options in one or a plurality of cells of the multi-dimensional electronic spreadsheet by including an identifier associated with the selected user option in content of the one or a plurality of cells;
    receiving an input to the user interface, via a peripheral device coupled to the computing system, the input specifying a status setting of the selected user option;
    reconfiguring the memory of the computer system to represent a modified model based on the input received via the user interface;
    determining a value of each of the one or plurality of cells based on the status of the selected user option as either being the first Boolean variable state or the second Boolean variable state, as specified by the input to the user interface; and
    providing an output of the modified model via an output device of the computer system based on the determined value of each of the one or plurality of cells, wherein the output of the modified model provides information to a user regarding a scenario in which the selected user option has a status setting corresponding to the received input.

2. The method according to claim 1, wherein each record in the user options table data structure comprises a user option index, a name of a corresponding user option associated with the record, and a status value of the corresponding user option associated with the record.

3. The method according to claim 1 wherein the user interface comprises:
    a user options listing portion that lists each of the one or more user options,
    a status portion that identifies, for each user option of the one or more user options, a current status of the user option, and
    a user controls portion that provides user selectable control elements associated with each of the one or more user options that, when selected by a user via an input device, changes a status of a corresponding user option in the user options listing and updates a corresponding record in the user options table data structure.

4. The method according to claim 3, wherein the user option listing includes an editor through which a name of a user option in the one or more user options is changed.

5. The method according to claim 3, wherein the user interface is a graphical user interface, and wherein the control elements are virtual buttons of the graphical user interface.

6. The method according to claim 5, wherein the user interface comprises a dialog box displayed on a screen of the computer system.

7. The method of claim 3, wherein the one or more user options that are listed in the user options listing portion of the user interface are presented in the user options listing portion according to an index sequence of indices of the one or more user options, starting with an index representing a last recorded user option.

8. The method according to claim 1 wherein referencing a selected user option of the one or more user options in one or a plurality of cells of the multi-dimensional electronic spreadsheet comprises inserting a name of the selected user option as a named range variable in an equation of the one or plurality of cells, and wherein determining a value of each of the one or plurality of cells comprises computing the value of the one or plurality of cells according to a value corresponding to a Boolean variable state of the selected user option.

9. The method according to claim 8, wherein the value corresponding to the Boolean variable state is a numerical one when the Boolean variable state is "True", and wherein the value corresponding to the Boolean variable state is a numerical zero when the Boolean variable state is "False."

10. The method of claim 1, further comprising:
    providing an application for execution by the computer system, wherein the application is defined by the multi-dimensional electronic spreadsheet, and wherein the output of the multi-dimensional electronic spreadsheet represents a scenario of the application specified by the status of the one or more user options.

11. The method of claim 1, wherein the output device is a display device, the model is a financial model, and wherein the output of the modified model is provided to a user via the display device.

12. A computing system for processing user defined Boolean variables in a multi-dimensional, electronic spreadsheet comprising a plurality of cells identified by a cell address along each dimension, the computing system comprising:
    a processor;
    a storage device coupled to the processor, wherein the storage device provides a user options table data structure identifying one or more user options that are defined as Boolean variables, wherein the user options table data structure comprises a record for each user option of the one or more user options, and wherein each record stores an identifier associated with a corresponding user option for the record; and a memory coupled to the processor, wherein the memory contains instructions which, when executed by the processor, cause the processor to:

provide a model by configuring the memory of the computer system to represent a multi-dimensional electronic spreadsheet model;

provide a user interface through which the one or more user options are defined, wherein a status of the one or more user options is set via the user interface to either a first Boolean variable state corresponding to a "True" state or a second Boolean variable state corresponding to a "False" state;

reference a selected user option of the one or more user options in one or a plurality of cells of the multi-dimensional electronic spreadsheet by including an identifier associated with the selected user option in content of the one or a plurality of cells;

receive an input to the user interface, via a peripheral device coupled to the computing system, the input specifying a status setting of the selected user option;

reconfigure the memory of the computer system to represent a modified model based on the input received via the user interface;

determine a value of each of the one or plurality of cells based on the status of the selected user option as either being the first Boolean variable state or the second Boolean variable state, as specified by the input to the user interface; and provide an output of the modified model via an, output device of the computer system based on the determined value of each of the one or plurality of cells, wherein the output of the modified model provides information to a user regarding a scenario in which the selected user option has a status setting corresponding to the received input.

13. The computing system according to claim 12, wherein each record in the user options table data structure comprises a user option index, a name of a corresponding user option associated with the record, and a status value of the corresponding user option associated with the record.

14. The computing system according to claim 12, wherein the user interface comprises:

a user options listing portion that lists each of the one or more user options, a status portion that identifies, for each user option of the one or more user options, a current status of the user option, and a user controls portion that provides user selectable control elements associated with each of the one or more user options that, when selected by a user via an input device, changes a status of a corresponding user option in the list user options listing and updates a corresponding record in the user options table data structure.

15. The computing system according to claim 14, wherein the user option listing includes an editor through which a name of a user option in the one or more user options is changed.

16. The computing system according to claim 12, wherein the instructions cause the processor to reference a selected user option of the one or more user options in one or a plurality of cells of the multi-dimensional electronic spreadsheet by inserting a name of the selected user option as a named range variable in an equation of the one or plurality of cells, and wherein the instructions cause the processor to determine a value of each of the one or plurality of cells by computing the value of the one or plurality of cells according to a value corresponding to a Boolean variable state of the selected user option.

17. The computing system according to claim 16, wherein the value corresponding to the Boolean variable state is a numerical one when the Boolean variable state is "True," and wherein the value corresponding to the Boolean variable state is a numerical zero when the Boolean variable state is "False."

18. A computer program product comprising a tangible computer useable medium having a computer readable program, wherein the computer readable program, when executed on a computing device, causes the computing device to:

provide a model by configuring a memory of the computer system to represent a multi-dimensional electronic spreadsheet model;

provide a user options table data structure identifying one or more user options that are defined as Boolean variables, wherein the user options table data structure comprises a record for each user option of the one or more user options, and wherein each record stores an identifier associated with a corresponding user option for the record; and provide a user interface through which the one or more user options are defined, wherein a status of the one or more user options is set via the user interface to either a first Boolean variable state corresponding to a "True" state or a second Boolean variable state corresponding to a "False" state;

reference a selected user option of the one or more user options in one or a plurality of cells of the multi-dimensional electronic spreadsheet by including an identifier associated with the selected user option in content of the one or a plurality of cells;

receive an input to the user interface, via a peripheral device coupled to the computing system, the input specifying a status setting of the selected user option;

reconfigure the memory of the computer system to represent a modified model based on the input received via the user interface;

determine a value of each of the one or plurality of cells based on the status of the selected user option as either being the first Boolean variable state or the second Boolean variable state, as specified by the input to the user interface; and provide an output of the modified model via an output device of the computer system based on the determined value of each of the one or plurality of cells, wherein the output of the modified model provides information to a user regarding a scenario in which the selected user option has a status setting corresponding to the received input.

19. The computer program product according to claim 18, wherein the user interface comprises:

a user options listing portion that lists each of the one or more user options, a status portion that identifies, for each user option of the one or more user options, a current status of the user option, and a user controls portion that provides user selectable control elements associated with each of the one or more user options that, when selected by a user via an input device, changes a status of a corresponding user option in the list user options listing and updates a corresponding record in the user options table data structure.

20. The computer program product according to claim 18, wherein the computer readable program causes the computing device to reference a selected user option of the one or more user options in one or a plurality of cells of the multi-dimensional electronic spreadsheet by inserting a name of the selected user option as a named range variable in an equation of the one or plurality of cells, and wherein the computer readable program causes the computing device to determine a value of each of the one or plurality of cells by computing the value of the one or plurality of cells according to a value corresponding to a Boolean variable state of the selected user option.

* * * * *